(12) United States Patent
Stamatatos et al.

(10) Patent No.: US 7,878,678 B1
(45) Date of Patent: Feb. 1, 2011

(54) ILLUMINATING SAFETY AND NOTIFICATION DEVICE

(76) Inventors: Haralambos A. Stamatatos, 441 Chatham Rd., Burlingame, CA (US) 94010; Brian O'Boyle, 22206 SW. Bushong Ter., Sherwood, OR (US) 97140

( * ) Notice: Subject to any disclaimer, the term of this patent is extended or adjusted under 35 U.S.C. 154(b) by 492 days.

(21) Appl. No.: 10/423,271

(22) Filed: Apr. 25, 2003

Related U.S. Application Data

(60) Provisional application No. 60/376,140, filed on Apr. 25, 2002.

(51) Int. Cl.
 *F21L 4/02* (2006.01)
(52) U.S. Cl. .................. 362/184; 362/219; 362/240; 362/249.02; 362/800; 116/63 P
(58) Field of Classification Search ............. 362/153, 362/153.1, 154, 800, 157, 158, 225, 219, 362/240, 249, 238, 184, 238 C, 186, 176, 362/486; 340/471, 473, 908, 183, 184, 907, 340/908.1, 321, 472; 116/63 R, 63 C, 63 P
See application file for complete search history.

(56) References Cited

U.S. PATENT DOCUMENTS

| | | | | |
|---|---|---|---|---|
| D244,910 S | * | 7/1977 | Chasen et al. ............... D8/367 |
| 5,149,190 A | | 9/1992 | MacKenzie ................ 362/234 |
| 5,294,924 A | * | 3/1994 | Dydzyk .................. 340/908.1 |
| 5,559,681 A | * | 9/1996 | Duarte ..................... 362/252 |
| 5,685,631 A | | 11/1997 | Dobert et al. ............. 362/158 |
| 5,785,410 A | * | 7/1998 | Branson, Sr. ............. 362/153.1 |
| 5,814,968 A | * | 9/1998 | Lovegreen et al. .......... 320/113 |
| 5,957,564 A | * | 9/1999 | Bruce et al. ................ 362/84 |
| 6,183,100 B1 | * | 2/2001 | Suckow et al. .............. 362/35 |
| 6,208,073 B1 | * | 3/2001 | Wang et al. ................ 313/500 |
| 6,249,091 B1 | * | 6/2001 | Belliveau ................. 315/312 |
| 6,292,901 B1 | * | 9/2001 | Lys et al. .................. 713/300 |
| 6,341,875 B1 | * | 1/2002 | Chu ........................ 362/252 |
| 6,515,434 B1 | * | 2/2003 | Biebl ....................... 315/291 |
| 6,517,214 B1 | | 2/2003 | Mitchell, Jr. et al. ........ 362/108 |
| 6,549,121 B2 | | 4/2003 | Povey et al. ............... 340/322 |
| 6,559,605 B2 | * | 5/2003 | Wu et al. ................ 315/185 S |
| 6,641,283 B1 | * | 11/2003 | Bohler ..................... 362/238 |
| 6,659,622 B2 | * | 12/2003 | Katogi et al. .............. 362/219 |
| 6,683,532 B2 | * | 1/2004 | Peet et al. ................. 340/321 |

(Continued)

*Primary Examiner*—Sandra L O Shea
*Assistant Examiner*—Leah S Lovell
(74) *Attorney, Agent, or Firm*—Haverstock & Owens LLP

(57) ABSTRACT

The safety beacon of the present invention includes an arrangement of light emitting diodes (LEDs) controlled by a controller circuit and preferably powered by a rechargeable battery source. The rechargeable battery source will recharge when coupled to any appropriate power source, including a power outlet within a vehicle and a conventional wall power outlet. Further, when coupled to such a power source, the safety beacon will draw power for operation from the power source without using the battery source. The safety beacon encases the LEDs with a base preferably of a hard rubber casing and an outer housing forming a lens and preferably made of a high impact clear plastic. The safety beacon includes a port and connecting cable so that multiple safety beacons can be strung together. In such a configuration, the multiple safety beacons are configured to share power with all safety beacons within the chain. Preferably, the safety beacon includes a magnet within its base for affixing the safety beacon to metal surfaces, such as the surface of an automobile. The safety beacon also preferably is operated either manually or by a remote control device.

45 Claims, 9 Drawing Sheets

U.S. PATENT DOCUMENTS 6,739,735 B2 * 5/2004 Talamo et al. ............... 362/249
6,752,515 B2   6/2004 Evans et al. ................. 362/184
6,869,204 B2 * 3/2005 Morgan et al. .............. 362/257

* cited by examiner

ILLUMINATING SAFETY AND NOTIFICATION DEVICE

RELATED APPLICATIONS

This application claims priority under 35 U.S.C. §119(e) of the co-pending U.S. provisional application Ser. No. 60/376,140 filed on Apr. 25, 2002 and entitled "ILLUMINATING SAFETY AND NOTIFICATION DEVICE." The provisional application Ser. No. 60/376,140 filed on Apr. 25, 2002 and entitled "ILLUMINATING SAFETY AND NOTIFICATION DEVICE" is also hereby incorporated by reference.

FIELD OF THE INVENTION

The present invention relates to lighting devices. More particularly, the present invention relates to safety lighting devices for providing a warning or alert to persons within the vicinity of the lighting device.

BACKGROUND OF THE INVENTION

Traditionally, roadside safety flares have been used to provide a warning or alert to passing motorists of an accident or mishap. Police officers, highway patrol officers and safety officers all use roadside safety flares when they need to alert passing motorists to a potential hazard in the roadway. The presence of a flare alerts motorists to the existence of a hazard and of the need to slow down.

The conventional flare is an incendiary device which must be ignited. When the flare is ignited there is a risk of burning to the user. Also, when burning, the flare releases noxious fumes. The conventional flare is also a one-time use device with a short lifetime which must be discarded after use.

SUMMARY OF THE PRESENT INVENTION

The safety beacon of the present invention includes an arrangement of light emitting diodes (LEDs) controlled by a controller circuit and preferably powered by a rechargeable battery source. The rechargeable battery source will recharge when coupled to any appropriate power source, including a power outlet within a vehicle and a conventional wall power outlet. Further, when coupled to such a power source, the safety beacon will draw power for operation from the power source without using the battery source. The safety beacon encases the LEDs with a base preferably of a hard rubber casing and an outer housing forming a lens and preferably made of a high impact clear plastic. The safety beacon includes a port and connecting cable so that multiple safety beacons can be strung together. In such a configuration, the multiple safety beacons are configured to share power with all safety beacons within the chain. Preferably, the safety beacon includes a magnet within its base for affixing the safety beacon to metal surfaces, such as the surface of an automobile. The safety beacon also preferably is operated either manually or by a remote control device.

In an aspect of the present invention, a portable lighting device comprises one or more light emitting diodes, a power source coupled to the light emitting diodes, a controller coupled to the light emitting diodes and to the power source to control operation of the portable lighting device and a connection port configured to couple the portable lighting device to a second portable lighting device. The power source is preferably rechargeable. The portable lighting device further comprises a power port, wherein the power source is recharged by connecting a connector cable to the power port and to a power outlet. Alternatively, the power source is a battery. In a further alternate embodiment, the power source is a solar cell. The portable lighting device further comprises a base for supporting the light emitting diodes. The portable lighting device further comprises a protective housing for protecting the light emitting diodes. The protective housing forms a lens for the light emitting diodes. The portable lighting device further comprises a wireless receiver coupled to the controller for receiving control signals from one or more of a remote control device and the second portable lighting device. The wireless receiver preferably receives radio frequency signals from the remote control device. The wireless receiver alternatively receives infrared signals from the remote control device. Power and control signals are shared between the portable lighting device and the second portable lighting device. The portable lighting device further comprises an attachment means for affixing the portable lighting device to a surface. The attachment means is preferably a magnet. The portable lighting device further comprises a supporting base adapter configured to couple to a safety cone and provide a support platform for supporting the portable lighting device.

In a further aspect of the present invention, a portable lighting device comprises one or more light emitting diodes, a power source coupled to the light emitting diodes, a connection port configured to couple the portable lighting device to a second portable lighting device and a protective housing forming a lens over the light emitting diodes. The power source is preferably rechargeable. The portable lighting device further comprises a power port, wherein the power source is recharged by connecting a connector cable to the power port and to a power outlet. Alternatively, the power source is a battery. Alternatively, the power source is a solar cell. The portable lighting device further comprising a base for supporting the light emitting diodes. The protective housing is coupled to the base to form a protective unit over the light emitting diodes. The portable lighting device further comprises a wireless receiver coupled to the controller for receiving control signals from a remote control device. The wireless receiver preferably receives radio frequency signals from the remote control device. The wireless receiver alternatively receives infrared signals from the remote control device. Power and control signals are shared between the portable lighting device and the second portable lighting device. The portable lighting device further comprises an attachment means for affixing the portable lighting device to a surface. The attachment means is preferably a magnet. The portable lighting device further comprises a supporting base adapter configured to couple to a safety cone and provide a support platform for supporting the portable lighting device.

In still a further aspect of the present invention, a set of portable lighting devices comprises a plurality of portable lighting devices, each including one or more light emitting diodes, a power source coupled to the light emitting diodes, a controller coupled to the light emitting diodes and to the power source to control operation of the portable lighting device and a connection port coupled to the controller and a plurality of connectors coupled between connection ports of the portable lighting devices for coupling the plurality of portable lighting devices together. The power source is preferably rechargeable. At least one of the plurality of portable lighting devices further comprises a power port, wherein the power source is recharged by connecting a connector cable to the power port and to a power outlet. Alternatively, the power source is a battery. Alternatively, the power source is a solar cell. Each of the portable lighting devices further comprise a base for supporting the light emitting diodes. Each of the portable lighting devices further comprise a protective housing for protecting the light emitting diodes. The protective housing forms a lens for the light emitting diodes. At least one of the plurality of portable lighting devices further comprises a wireless receiver coupled to the controller for receiving control signals from a remote control device. The wireless receiver preferably receives radio frequency signals from the remote control device. The wireless receiver alternatively receives infrared signals from the remote control device. Power and control signals are shared between the portable lighting devices. Each of the portable lighting devices further comprise an attachment means for affixing the portable lighting device to a surface. Preferably, the attachment means is a magnet. The set of portable lighting devices further comprises a supporting base adapter configured to couple to a safety cone and provide a support platform for supporting one of the portable lighting devices.

DETAILED DESCRIPTION OF THE PREFERRED EMBODIMENT

The safety beacon of the present invention is an identification light source or safety light with multiple uses. The safety beacon includes an arrangement of light emitting diodes (LEDs) controlled by a controller circuit. The LEDs and the controller circuit are preferably powered by a rechargeable battery source. The rechargeable battery source will recharge when coupled to any appropriate power source, including a power outlet within a vehicle and a conventional wall outlet. Further, when coupled to such a power source, the safety beacon will draw power for operation from the power source without using the battery source. The safety beacon encases the array of LEDs with a base preferably of a hard rubber casing and an outer housing forming a lens and preferably made of a high impact clear plastic. The safety beacon includes a port and connecting cable so that multiple safety beacons can be strung together. In such a configuration, the multiple safety beacons are configured to share power with all safety beacons within the chain. Also, in the multiple safety beacon configuration, the safety beacons pass control signals in order to provide sequential flashing illumination up and down the set of safety beacons, if set to that mode. Preferably, the safety beacon includes a magnet within its base for affixing the safety beacon to metal surfaces, including but not limited to the surface of an automobile, heavy equipment, barricades, light posts and warehouse shelving. The safety beacon also preferably is operated either manually or by a remote control device. The safety beacon includes a wireless receiver for receiving control signals from the remote control device. In an alternate embodiment, the safety beacon includes a wireless transceiver not only for receiving control signals from the remote control device, but also for wirelessly sending and receiving control signals to and from other safety beacons. In this alternate embodiment, the safety beacons wirelessly pass control signals in order to provide sequential flashing illumination up and down the set of safety beacons, without the need for connecting cables.

Figure 1:
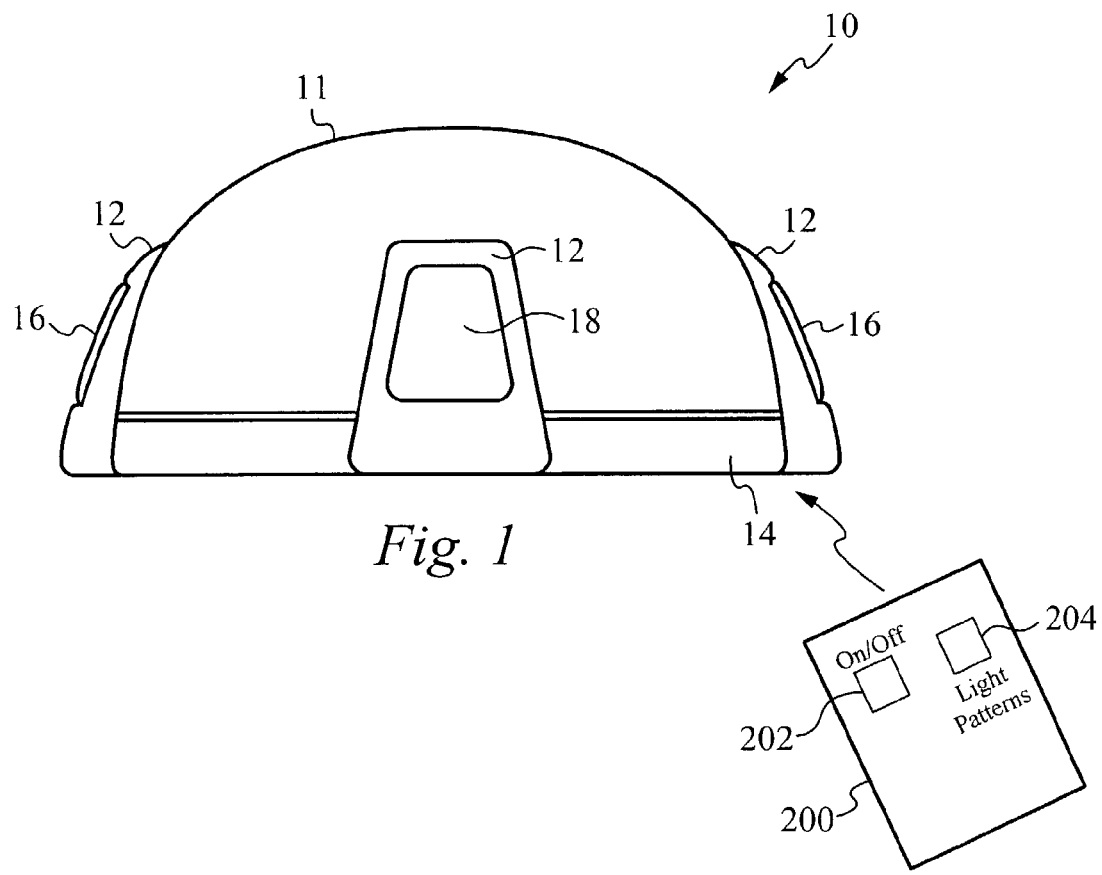
FIG. 1 illustrates a front view of the safety beacon of the preferred embodiment of the present invention.

A front view of the safety beacon of the preferred embodiment of the present invention is illustrated in FIG. 1. The safety beacon 10 preferably includes a base 14, an outer housing 11 and four protective posts 12 positioned an equal distance around the outer housing 11. In the preferred embodiment, the protective posts 12 are integrally coupled to the base 14. In an alternate embodiment, the protective posts 12 are each connected to the base 14 and the outer housing 11 separately, in any appropriate manner. Preferably, there is a connecting port 16 within a center cutout of two protective posts 12 disposed on opposite sides of the safety beacon 10. Alternatively, any number of connecting ports 16 can be included around the safety beacon. Each connecting port 16 includes a female adapter for receiving the end of a cable, as described in more detail below, in order to couple multiple safety beacons 10 together. In the preferred embodiment, a power switch 18 is included within a center cutout of one of the protective posts 12 for turning the safety beacon 10 on and off. Also, in manual operation, the power switch 18 is preferably used to toggle through the different modes of operation of the safety beacon, including OFF, STEADY and FLASHING.

In the preferred embodiment of the present invention, the operation of the safety beacon 10 is also controlled from a remote control device 200. Preferably, the remote control 200 sends wireless commands to a radio frequency receiver within the safety beacon 10. Alternatively, the remote control 200 sends the wireless commands in any appropriate manner, including infrared or bluetooth. The remote control 200 includes a power button 202 for turning the safety beacon 10 on and off. The remote control 200 also includes a light pattern control button 204 for controlling the display of the light emitting diodes within the safety beacon 10. Using the light pattern control button 204, a user preferably can toggle between light patterns of steady and blinking.

The outer housing 11 preferably is screwed into the base 14 to form an integral unit for use. Alternatively, the outer housing 11 is coupled to the base 14 in any appropriate manner including by snap fit. The outer housing 11 and the base 14 are preferably formed of durable and sturdy materials in order to withstand longterm use in inclement weather and substantial impacts. Within the preferred embodiment of the present invention, the base 14 and the protective posts 12 are formed of thermo plastic urethane and the outer housing 11 is formed of a tinted polycarbonate vacuum molded lens. Alternatively, the outer housing 11 is formed of any other appropriate material, including tinted acrylic. Further, the base 14 is formed of any other appropriate material.

Figure 2:
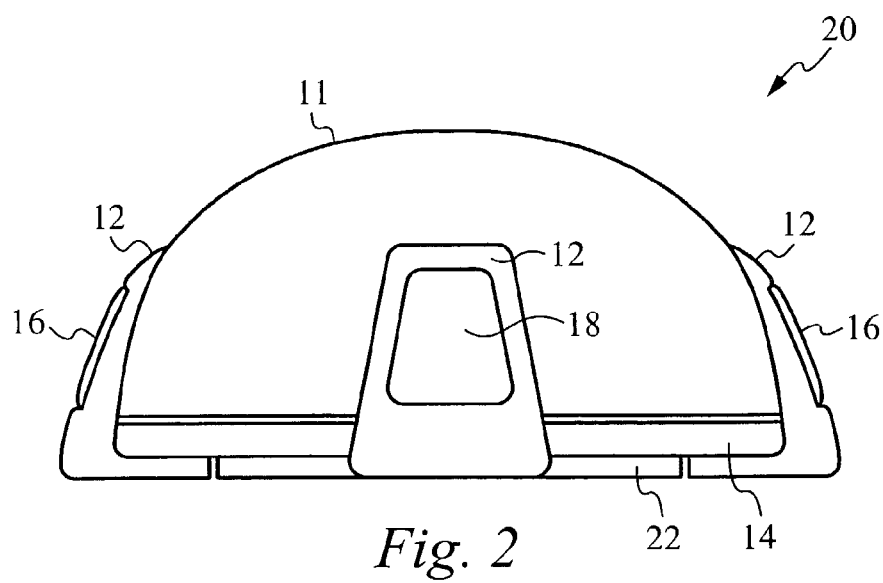
FIG. 2 illustrates a front view of the safety beacon of an alternative embodiment.

A front view of the safety beacon of an alternate embodiment of the present invention is illustrated in FIG. 2. The safety beacon 20 includes a base 14, an outer housing 11 and four protective posts 12 positioned an equal distance around the outer housing 11, as included in the safety beacon of the preferred embodiment. In contrast to the safety beacon of the preferred embodiment, the protective posts 12 of the safety beacon 20 extend below the base 14. The safety beacon 20 also includes a magnet 22 underneath the center of the base 14 for affixing the safety beacon 20 to metal surfaces, such as the sides or top of a vehicle.

Figure 3:
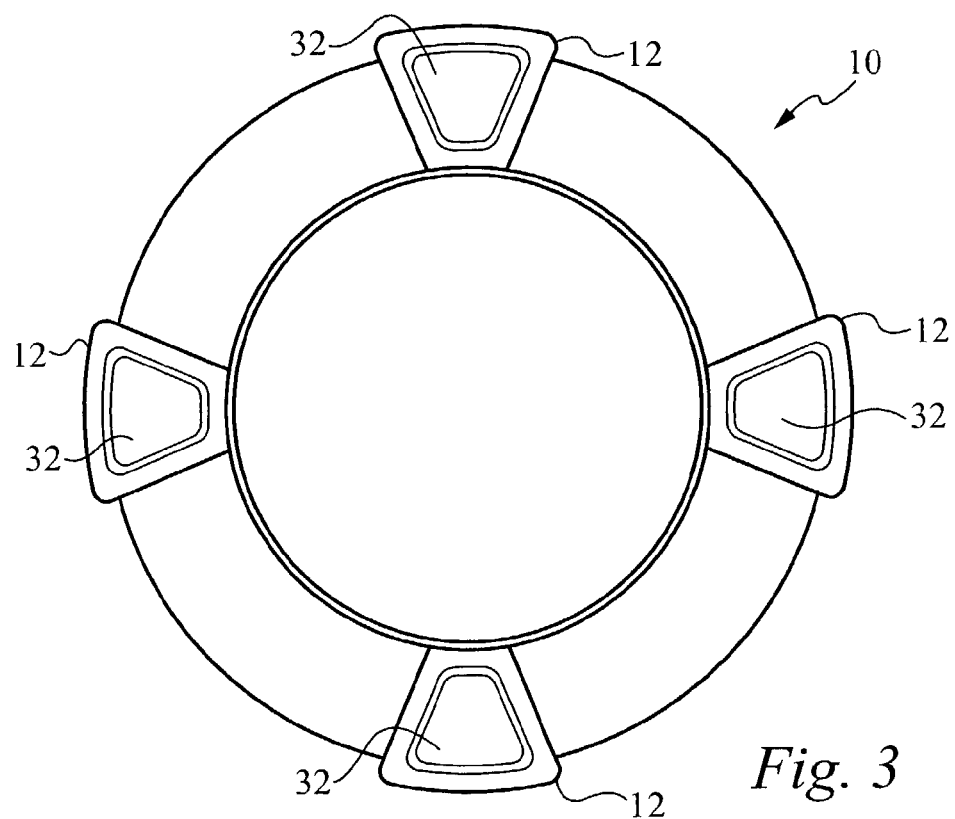
FIG. 3 illustrates a bottom view of the safety beacon of the present invention.

A bottom of the safety beacon 10 of the preferred embodiment of the present invention is illustrated in FIG. 3. The safety beacon 10 includes magnets 32 within the bottom of the protective posts 12 for affixing the safety beacon 10 to metal surfaces, such as the sides or top of a vehicle, heavy equipment, barricades, light posts and warehouse shelving.

Figure 4:
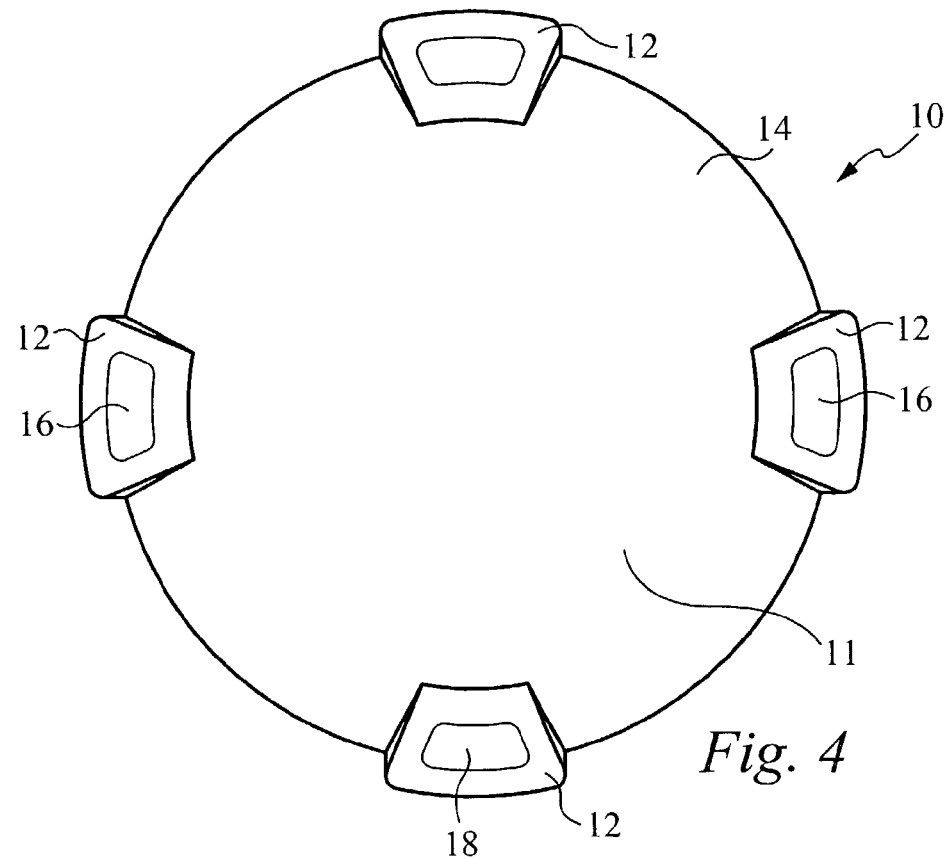
FIG. 4 illustrates a top view of the safety beacon of the present invention.

A top view of the safety beacon 10 of the preferred embodiment of the present invention is illustrated in FIG. 4. As discussed above, the safety beacon 10 preferably includes a base 14, an outer housing 11 and four protective posts 12 positioned an equal distance around the outer housing 11. A power switch 18 is included within a center cutout of one of the protective posts 12 for turning the safety beacon 10 on and off and toggling manually through the modes of operation. There is also preferably a connecting port 16 within a center cutout of two protective posts 12 disposed on opposite sides of the safety beacon 10.

Figure 5:
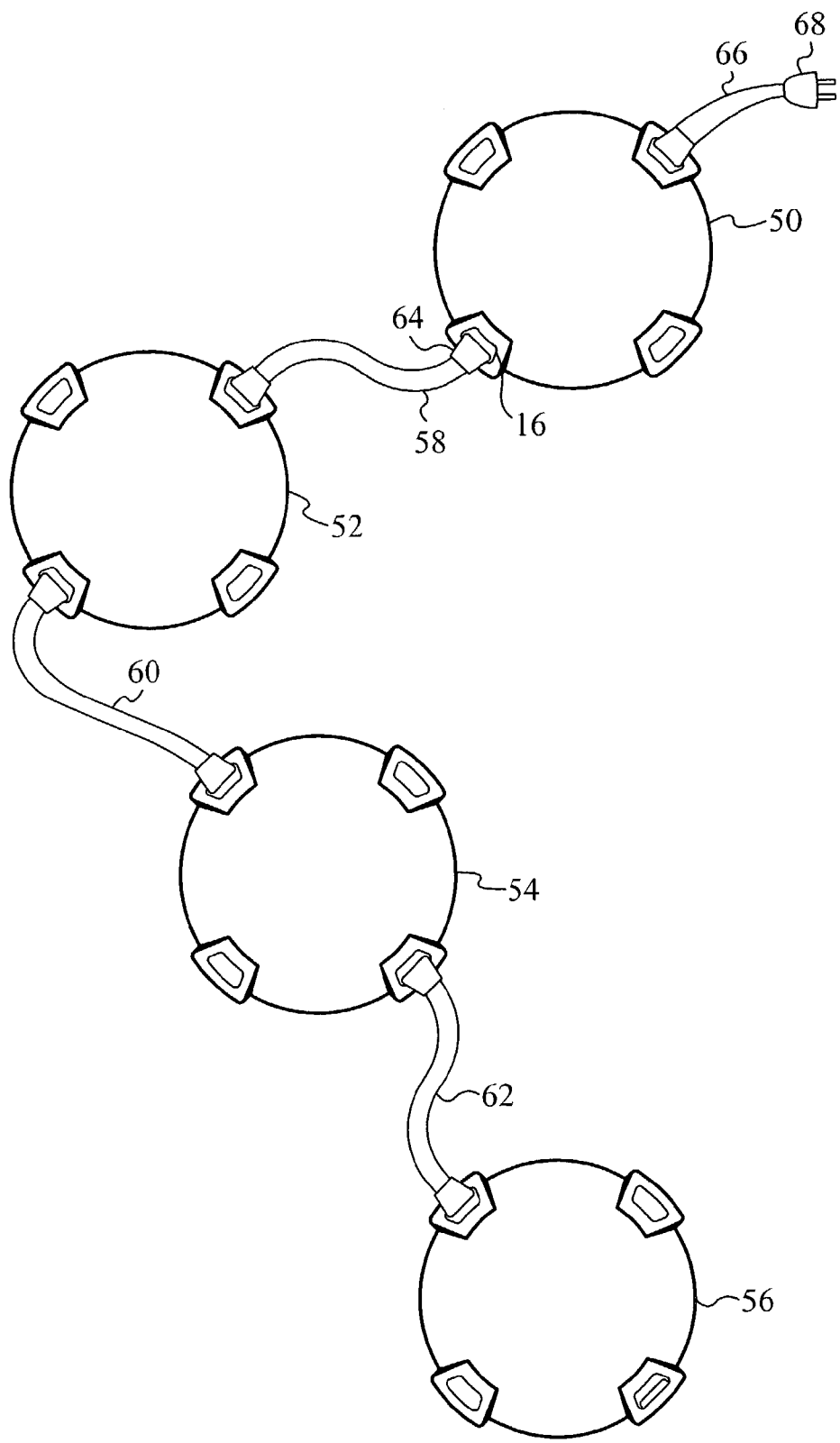
FIG. 5 illustrates a set of safety beacons coupled together by cables.

A set of safety beacons coupled together by cables is illustrated in FIG. 5. The set of safety beacons illustrated in FIG. 5 includes four safety beacons for exemplary purposes. It should be understood that any number of safety beacons can be coupled together in this manner. A first safety beacon 50 is coupled to a second safety beacon 52 by a connecting cable 58. The second safety beacon 52 is coupled to a third safety beacon 54 by a connecting cable 60. The third safety beacon 54 is coupled to a fourth safety beacon 56 by a connecting cable 62. Each of the cables 58, 60 and 62 include a plug 64 on each end which fits into a connecting port 16 on the safety beacon. A power cable 66 is also plugged into the first safety beacon 50 for providing power to the set of safety beacons. The power cable 66 includes a plug 68 configured to plug into a conventional wall power outlet. The power cable 66 can also include a plug to plug into a vehicle power adapter, such as a cigarette lighter. The power cable 66 is also used to recharge the rechargeable battery within the safety beacon, as will be discussed below.

When coupled together by a cable, the safety beacons share power and control signals. When the power cable 66 is plugged into a power source and to a safety beacon within the set, all of the safety beacons coupled together within the set draw power from the power source. When none of the safety beacons within the set are coupled to a power cable 66, the safety beacons within the set each draw power first from their own rechargeable battery and then from the rechargeable batteries of the other safety beacons within the set, until none of the rechargeable batteries have any power remaining. Preferably, using the remote control 200 (FIG. 1), the safety beacons within the set can be controlled to all have a steady light or blink. The safety beacons within the set can also be controlled to each flash sequentially up and down the set of safety beacons, by passing an alternating control signal through the cables.

In an alternate embodiment, the safety beacon includes a wireless transceiver not only for receiving control signals from the remote control device, but also for wirelessly sending and receiving control signals to and from other safety beacons. In this alternate embodiment, the safety beacons wirelessly pass control signals in order to provide sequential flashing illumination up and down the set of safety beacons, without the need for connecting cables.

Figure 6:
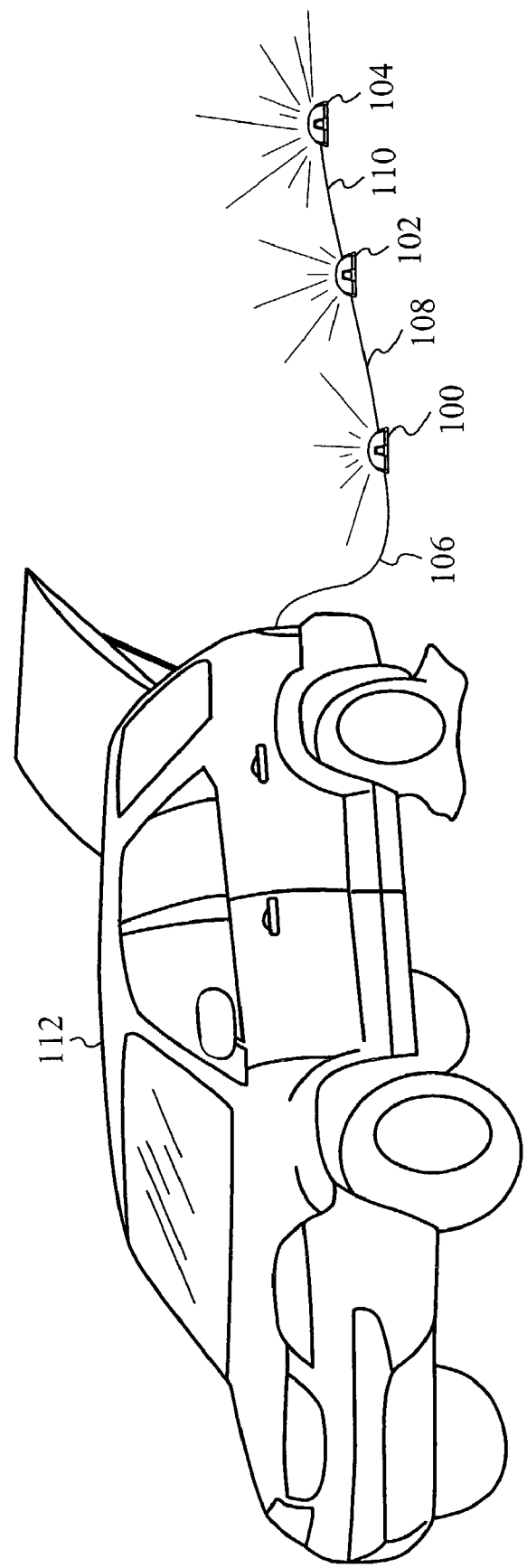
FIG. 6 illustrates a set of safety beacons coupled together by cables and coupled to a vehicle for power, protection and recharging.

A set of safety beacons coupled together by cables and coupled to a vehicle for power is illustrated in FIG. 6. In the exemplary configuration of FIG. 6, a power cable 106 is coupled between a power adapter within a vehicle 112 and a first safety beacon 100. The first safety beacon 100 is coupled to a second safety beacon 102 by a connecting cable 108. The second safety beacon 102 is coupled to a third safety beacon 104 by a connecting cable 110. The power cable 106 includes a plug on one end which fits into the first safety beacon 100 and a plug on the other end which fits into the power adapter within the vehicle 112. Each of the connecting cables 108 and 110 include a plug on each end which fits into a connecting port on the safety beacon.

In the configuration illustrated in FIG. 6, the power cable 106 provides power from the vehicle 112 to each of the safety beacons 100, 102 and 104, through the connecting cables 108 and 110. The power cable 106 is also used to recharge the rechargeable battery within the safety beacons 100, 102 and 104. In this configuration, in a unison mode, the set of connected safety beacons can be controlled to flash in unison with the vehicle's hazard lights, brake lights or turn signal.

Figure 7:
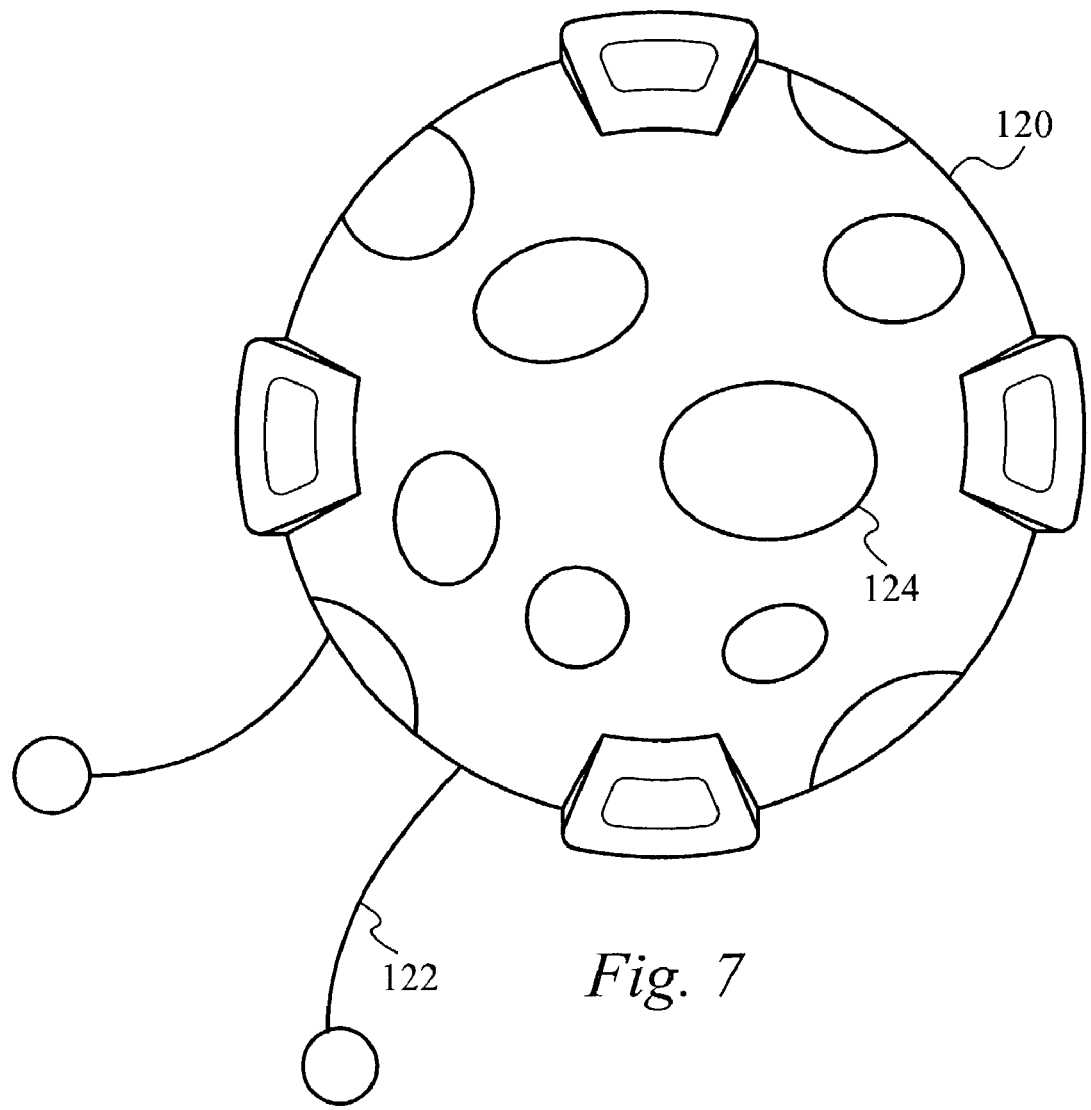
FIG. 7 illustrates a safety beacon of an alternate embodiment with a bug-like appearance.

An alternate embodiment of the safety beacon of the present invention is illustrated in FIG. 7. Within the alternate embodiment of FIG. 7, the appearance of the safety beacon 120 is altered in order to appear like a bug, with the addition of the antennae 122 and the stickers 124. The bug-like safety beacon 120 is meant to appeal to children in order to encourage children to use the safety beacon when playing in the front of their house or in other locations near busy traffic. Use of the safety beacon of the present invention in these circumstances will alert motorists of the presence of children playing and encourage them to slow down. The outer housing of the safety beacon can have different colors and interchangeable lenses in order to change the appearance of the safety beacon for different uses and conditions.

Figure 8A:
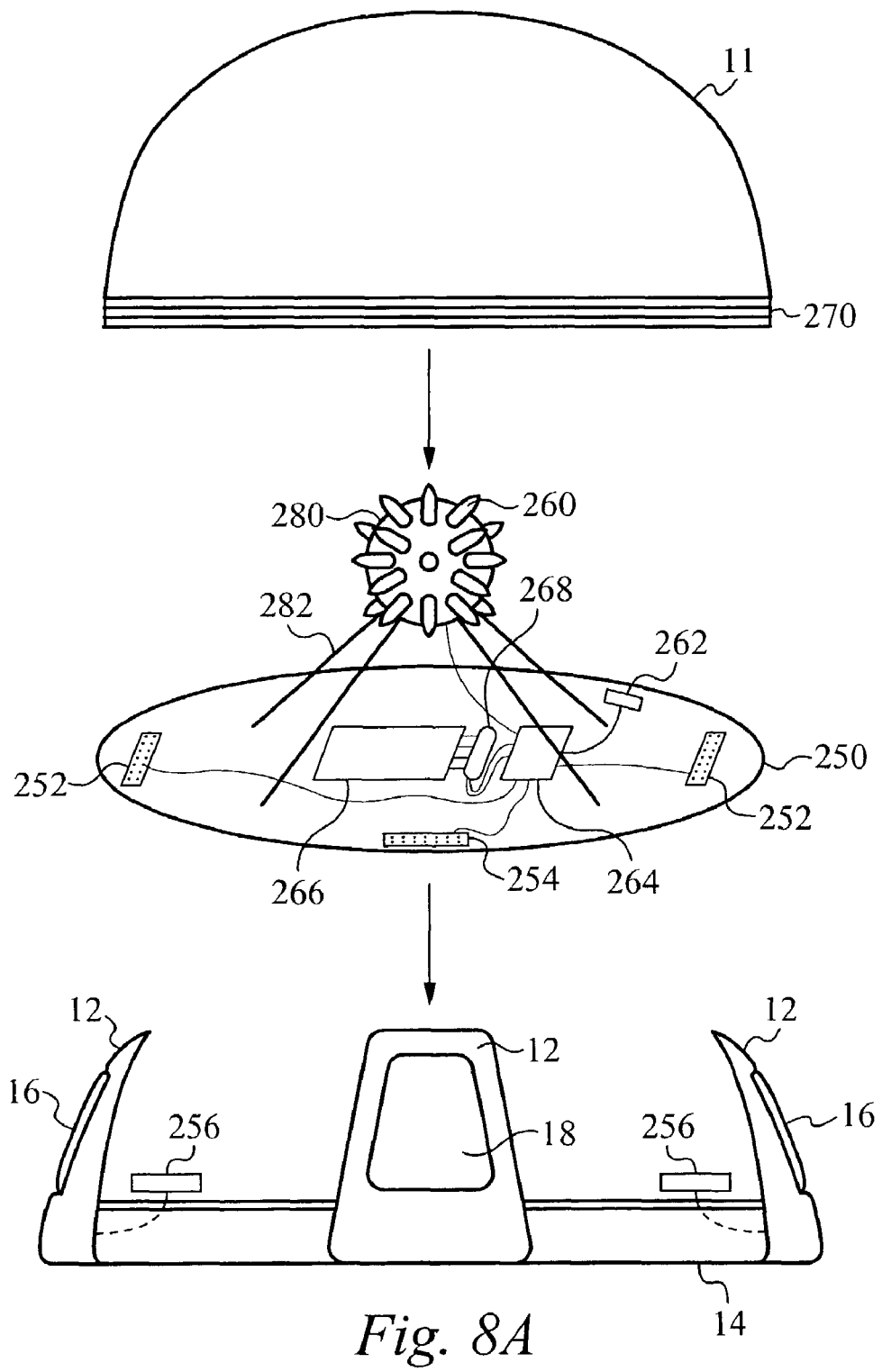
FIG. 8A illustrates components and assembly within the preferred embodiment of the safety beacon of the present invention.

The components within the preferred embodiment of the safety beacon of the present invention are illustrated in FIG. 8A. To assemble the safety beacon, a printed circuit board 250, supporting the LEDs 260 and including a rechargeable battery 266, a controller circuit 264, a wireless receiver 262 and connectors 252 and 254, is positioned within the base 14, the port connectors 256 are coupled to the connectors 252, a power connector (not shown) is coupled to the connector 254 and then the outer housing 11 is screwed into the base 14. The outer housing 11 preferably includes a threaded bottom 270 which is received by the base 14 in order to securely couple the outer housing 11 to the base 14.

On the printed circuit board 250, the controller circuit 264 is coupled to the rechargeable battery 266 by the connector 268. The controller circuit 264 is also coupled to control the operation of the LEDs 260. The controller circuit 264 is also coupled to the wireless receiver 262 for receiving wireless control signals from the remote control device 200 (FIG. 1). The controller circuit 264 is coupled to the connectors 252. The LEDs 260 are preferably positioned on a support 280 supported above the printed circuit 250 by the rigid supports 282.

When the printed circuit board 250 is installed within the base 14, the connectors 252 are coupled to the port connectors 256. The port connectors 256 are coupled to the ports 16 for providing the signals from the corresponding connecting cable to the controller circuit 264. When the printed circuit board 250 is installed within the base 14, the power connector 254 is coupled to a corresponding power connector coupled to the power switch 18. Once the printed circuit board 250 is installed and connected to the appropriate ports and power switch 18, the outer housing 11 is then preferably screwed into the base 14 to complete the assembly of the safety beacon 10. Alternatively, as discussed above, the outer housing 11 is coupled to the base 14 in any appropriate manner, in order to complete the assembly of the safety beacon 10, including by snap fit. If the battery 266 or an LED 260 needs to be replaced, the outer housing 11 can be unscrewed or unsnapped in order to allow access to the printed circuit board 250, its components and the LEDs 260.

Figure 8B:
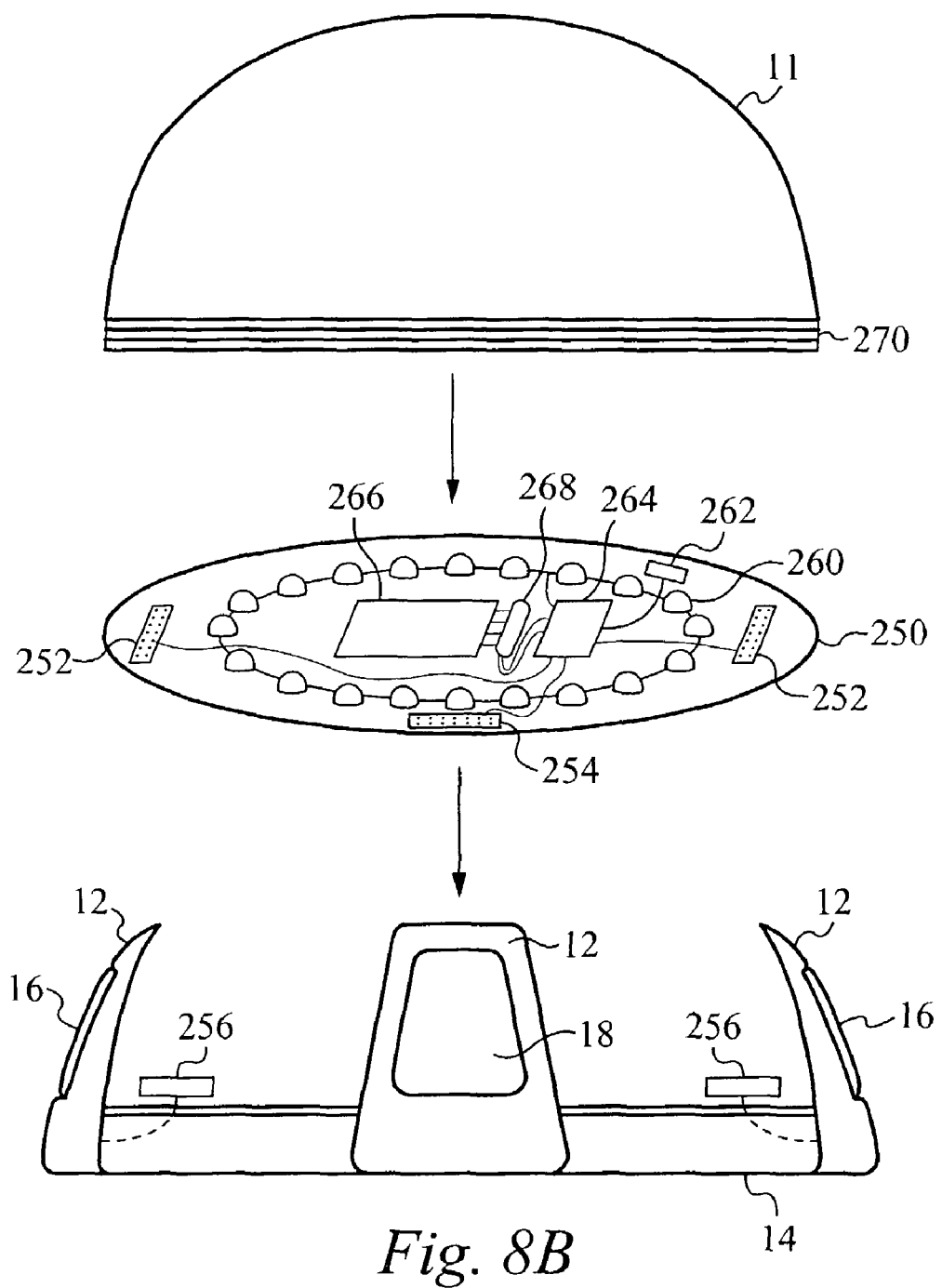
FIG. 8B illustrates components and assembly within an alternate embodiment of the safety beacon of the present invention.

The components within an alternate embodiment of the present invention are illustrated in FIG. 8B. In the embodiment illustrated in FIG. 8B, the LEDs 260 are included on the printed circuit board 250.

In operation, a single safety beacon is used by itself or multiple safety beacons are coupled together by cables in order to operate as a group. The safety beacons are turned on by using either a remote control device, as described above, or pressing the power button. Once turned on, the safety beacons preferably provide steady illumination. The safety beacons can also be controlled to provide blinking illumination or if connected in a set, to provide sequentially blinking illumination up and down the connected set of safety beacons. The safety beacons are coupled to a power source, such as a vehicle power adapter or a power outlet for drawing power for operation and for drawing power to recharge the rechargeable battery within the safety beacon. Alternatively, the battery source within the safety beacon is any appropriate battery source, including but not limited to a replaceable battery and a solar battery.

If multiple safety beacons are coupled together in a set, when first powered on, all of the safety beacons will start with a steady illumination. If the user then pushes the light patterns button on the remote control or toggles the power switch to the sequentially blinking mode, the first safety beacon will blink on and the other safety beacons will be turned off. The first safety beacon will then send a control signal to the next safety beacon through the connecting cable. When the next safety beacon receives this control signal, the next safety beacon will then turn on and then send a control signal to the next safety beacon within the set. When the final safety beacon within the set receives the control signal, it will turn on and then send the control signal back to the previous safety beacon. In this manner, the safety beacons provide a continuous sequential illumination with one safety beacon flashing at a time. In the alternate embodiment described above including wireless control communications between safety beacons, the safety beacons pass the control signals necessary for sequential illumination wirelessly between the safety beacons within the set.

The safety beacon of the present invention can be used in many different circumstances and situations. One of the main uses for the safety beacon of the present invention will be in the field of automotive safety. A power cable can be plugged into a vehicle power adapter, as described above, or hardwired into the vehicle's electrical system with a power and recharging port available for connection to a safety beacon by a cable. As an automotive safety beacon, the safety beacon can be positioned on the roadway behind the automobile, as shown in FIG. 6, or attached to the automobile using the magnetic bottom. This feature is extremely beneficial on roads with no shoulder or on city streets where there may be no room for conventional flares or lights to be placed on the ground near the automobile. Using the magnetic bottom, the safety beacon can also be attached to vehicles being towed. It should be apparent to those skilled in the art that any other appropriate means for affixing the safety beacon to a surface can be used, including but not limited to screws, nails, velcro and tape. Traffic control personnel can also use safety beacons to help direct traffic and alert motorists to traffic patterns. Safety beacons can be used at major events for traffic control and illuminating pathways to be followed by automobiles or other vehicles. Safety beacons can also be used for funeral processions as a notification to other drivers as to their need to stay grouped together.

Figure 9A:
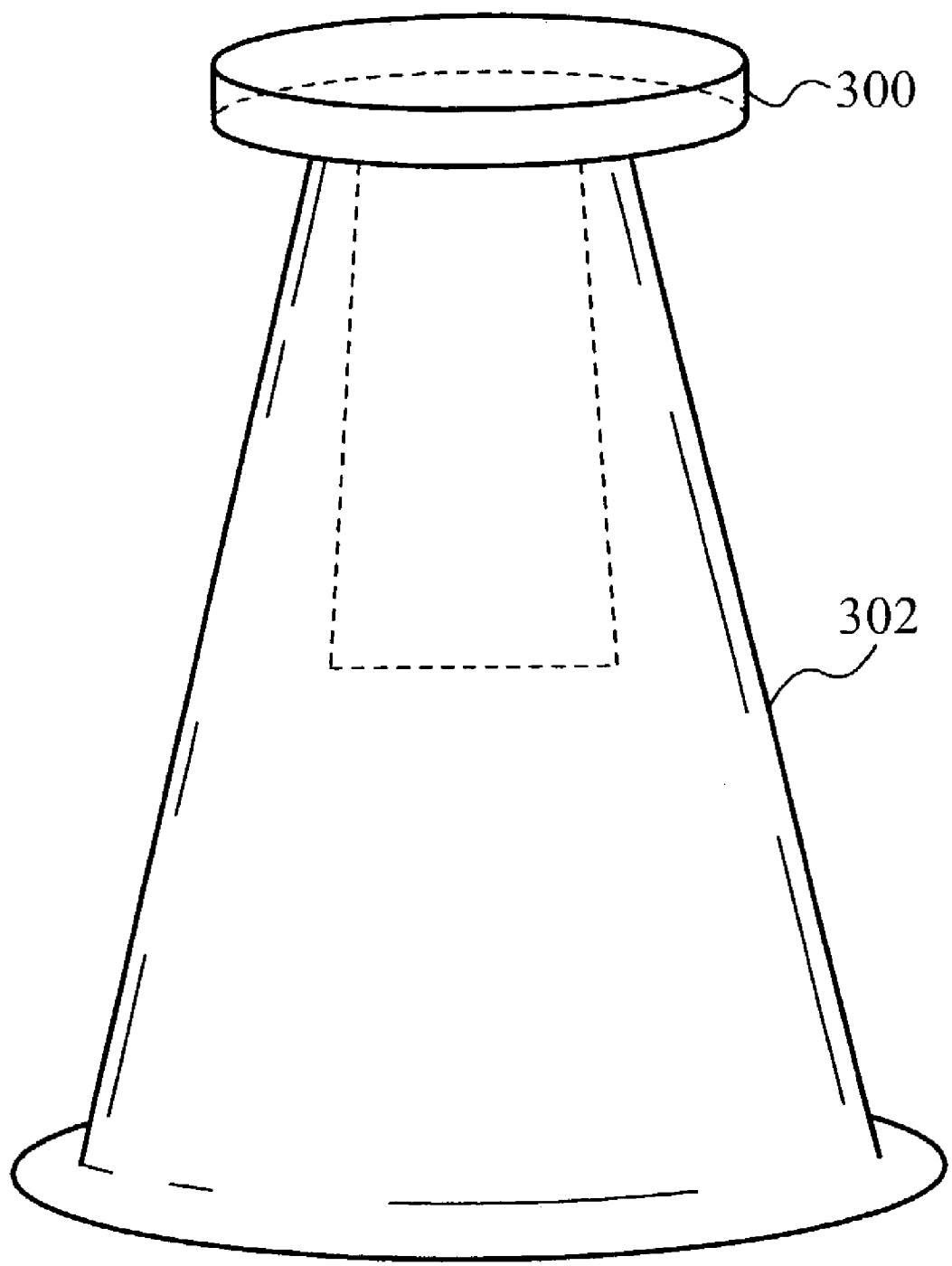
FIG. 9A illustrates a supporting base adapter which fits into a standard safety cone and supports the safety beacon of the present invention.
Figure 9B:
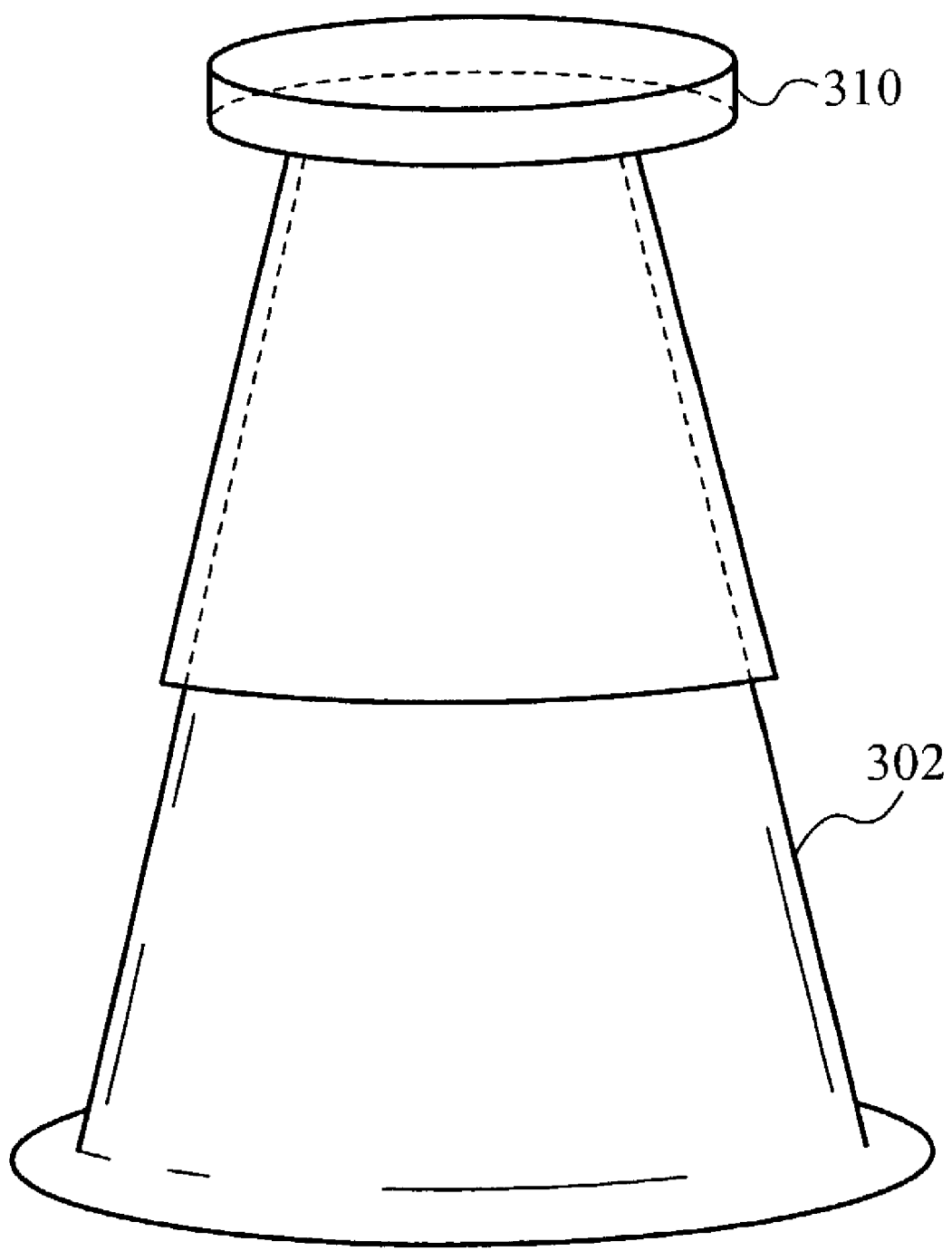
FIG. 9B illustrates a supporting base adapter which fits over a standard safety cone and supports the safety beacon of the present invention.

Roadway workers and cleanup crews can also use safety beacons for protection to notify passing traffic that they are working near or on the roadside. A supporting base adapter which fits into a standard safety cone is illustrated in FIG. 9A. The supporting base adapter 300 of FIG. 9A fits inside a safety cone 302 and provides a platform on which a safety beacon is placed. The safety beacon is then placed on the platform of the base adapter 300 and can operate on top of the safety cone 302. A supporting base adapter which fits over a standard safety cone is illustrated in FIG. 9B. The supporting base adapter 310 of FIG. 9B includes a sleeve which fits over a safety cone 302 and provides a platform on which a safety beacon is placed. The safety beacon is then placed on the platform of the base adapter 310 and can operate on top of the safety cone 302. The embodiment illustrated in FIG. 9B is preferred. In an alternate embodiment, the safety beacon includes a GPS chip for determining its location and a transceiver for communicating the location of the safety beacon for tracking purposes.

Another main use for the safety beacon of the present invention is in the field of child and neighborhood safety. The safety beacon can be used in front of households and in neighborhoods in which children are playing to alert passing drivers that children are present and may be playing in or near the street. The safety beacon can be placed out in the street while the children are playing and set to pulsate at bright levels that will provide an alert to oncoming drivers. The safety beacon can also be attached to backpacks and jackets in order to provide an alert, illumination and an enhanced warning to drivers while children or adults are walking or riding bicycles. As discussed above, using a base adapter, a safety beacon can also be attached to a safety cone and positioned near children playing in order to provide a warning to drivers. As should be apparent to those skilled in the art, the size of the base adapter can be varied to fit different size safety cones and other support structures.

The safety beacon of the present invention can also be used to provide alert and tracking for recreational uses, such as bicycling, snow skiing, water skiing and hiking. The safety beacon can also be attached to helmets and equipment for such use in order to provide an alert or illumination. As discussed above, in an alternate embodiment, the safety beacon includes a GPS tracking chip and a transceiver for communicating the location of the safety beacon. The safety beacon of this embodiment, can also be used by recreational users in order to track and identify their location. Further, the safety beacon with the GPS tracking chip can also be traced by law enforcement officers for tracking and locating stolen vehicles.

While the present invention has been described in terms of specific embodiments incorporating details to facilitate the understanding of the principles of construction and operation of the invention. As such, references, herein, to specific embodiments and details thereof are not intended to limit the scope of the claims appended hereto. It will be apparent to those skilled in the art that modifications can be made in the embodiment chosen for illustration without departing from the spirit and scope of the invention.

We claim:

1. A portable lighting device to provide light as a stand-alone device and also when coupled to a second portable lighting device, the portable lighting device comprising:
   a. one or more light emitting diodes each comprising a first protective housing;
   b. a power source coupled to the light emitting diodes;
   c. a first controller coupled to the light emitting diodes and to the power source to control operation of the portable lighting device, wherein the first controller is programmed to operate both independently and in response to signals from another portable lighting device;
   d. a first connection port configured to selectively couple the portable lighting device to a second portable lighting device, the second portable lighting device having a second controller and a second connection port, wherein both power and control signals are provided through the first connection port between the first controller of the portable lighting device and the second controller of the second portable lighting device when the portable lighting device is coupled to the second portable lighting device; and
   e. a second protective housing arranged to protect the one or more light emitting diodes.

2. The portable lighting device as claimed in claim 1 wherein the power source is rechargeable.

3. The portable lighting device as claimed in claim 2 further comprising a power port, wherein the power source is recharged by connecting a connector cable to the power port and to a power outlet.

4. The portable lighting device as claimed in claim 1 wherein the power source is a battery.

5. The portable lighting device as claimed in claim 1 wherein the power source is a solar cell.

6. The portable lighting device as claimed in claim 1 further comprising a base for supporting the light emitting diodes.

7. The portable lighting device as claimed in claim 1 wherein the light emitting diodes are contained within the second protective housing.

8. The portable lighting device as claimed in claim 1 wherein the second protective housing comprises a lens for the light emitting diodes.

9. The portable lighting device as claimed in claim 1 further comprising a wireless receiver coupled to the controller for receiving control signals from one or more of a remote control device and the second portable lighting device.

10. The portable lighting device as claimed in claim 9 wherein the wireless receiver receives radio frequency signals from the remote control device.

11. The portable lighting device as claimed in claim 9 wherein the wireless receiver receives infrared signals from the remote control device.

12. The portable lighting device as claimed in claim 1 further comprising an attachment means for affixing the portable lighting device to a surface.

13. The portable lighting device as claimed in claim 12 wherein the attachment means is a magnet.

14. The portable lighting device as claimed in claim 1 further comprising a supporting base adapter configured to couple to a safety cone and provide a support platform for supporting the portable lighting device.

15. The portable lighting device as claimed in claim 1 wherein the power source is rechargeable.

16. The portable lighting device as claimed in claim 15 further comprising a power port, wherein the power source is recharged by connecting a connector cable to the power port and to a power outlet.

17. The portable lighting device as claimed in claim 1 wherein the power source is a battery.

18. The portable lighting device as claimed in claim 1 wherein the power source is a solar cell.

19. The portable lighting device as claimed in claim 1 further comprising a base for supporting the light emitting diodes.

20. The portable lighting device as claimed in claim 19 wherein the protective housing is coupled to the base to form a protective unit over the light emitting diodes.

21. The portable lighting device as claimed in claim 1 further comprising a wireless receiver coupled to the controller for receiving control signals from a remote control device.

22. The portable lighting device as claimed in claim 21 wherein the wireless receiver receives radio frequency signals from the remote control device.

23. The portable lighting device as claimed in claim 21 wherein the wireless receiver receives infrared signals from the remote control device.

24. The portable lighting device as claimed in claim 1 wherein power and control signals are shared between the portable lighting device and the second portable lighting device.

25. The portable lighting device as claimed in claim 1 further comprising an attachment means for affixing the portable lighting device to a surface.

26. The portable lighting device as claimed in claim 25 wherein the attachment means is a magnet.

27. The portable lighting device as claimed in claim 1 further comprising a supporting base adapter configured to couple to a safety cone and provide a support platform for supporting the portable lighting device.

28. The portable lighting device as claimed in claim 1 wherein control communications are able to be initiated by both the first controller and the second controller.

29. A set of portable lighting devices comprising:
   a. a plurality of portable lighting devices, each comprising:
      i. one or more light emitting diodes each comprising a first protective housing;
      ii. a power source coupled to the light emitting diodes;
      iii. a controller coupled to the light emitting diodes and to the power source to control operation of the portable lighting device, wherein the controller is programmed to operate both independently and in response to signals from another portable lighting device;
      iv. a connection port coupled to the controller; and
      v. a second protective housing arranged to protect the one or more light emitting diodes; and
   b. a plurality of connectors selectively coupled between connection ports of the portable lighting devices for coupling the plurality of portable lighting devices together, wherein both power and control signals are provided through the connection ports and the plurality of connectors between the controllers.

30. The set of portable lighting devices as claimed in claim 29 wherein the power source is rechargeable.

31. The set of portable lighting devices as claimed in claim 30 wherein at least one of the plurality of portable lighting devices further comprises a power port, wherein the power source is recharged by connecting a connector cable to the power port and to a power outlet.

32. The set of portable lighting devices as claimed in claim 29 wherein the power source is a battery.

33. The set of portable lighting devices as claimed in claim 29 wherein the power source is a solar cell.

34. The set of portable lighting devices as claimed in claim 29 wherein each of the portable lighting devices further comprise a base for supporting the light emitting diodes.

35. The set of portable lighting devices as claimed in claim 29 wherein within each of the portable lighting devices the light emitting diodes are contained within the second protective housing.

36. The set of portable lighting devices as claimed in claim 29 wherein the second protective housing comprises a lens for the light emitting diodes.

37. The set of portable lighting devices as claimed in claim 29 wherein at least one of the plurality of portable lighting devices further comprises a wireless receiver coupled to the controller for receiving control signals from a remote control device.

38. The set of portable lighting devices as claimed in claim 37 wherein the wireless receiver receives radio frequency signals from the remote control device.

39. The set of portable lighting devices as claimed in claim 37 wherein the wireless receiver receives infrared signals from the remote control device.

40. The set of portable lighting devices as claimed in claim 29 wherein each of the portable lighting devices further comprise an attachment means for affixing the portable lighting device to a surface.

41. The set of portable lighting devices as claimed in claim 40 wherein the attachment means is a magnet.

42. The set of portable lighting devices as claimed in claim 29 further comprising a supporting base adapter configured to couple to a safety cone and provide a support platform for supporting one of the portable lighting devices.

43. The set of portable lighting devices as claimed in claim 29 wherein control communications are able to be initiated by the controller of any of the plurality of portable lighting devices.

44. A set of portable lighting devices comprising:
a. a first portable lighting device comprising:
 i. a first plurality of light emitting diodes each comprising a first protective housing;
 ii. a first power source coupled to the first plurality of light emitting diodes,
 iii. a first controller coupled to the first plurality of light emitting diodes and to the first power source to control operation of the first portable lighting device, wherein the controller is programmed to operate both independently and in response to signals from another portable lighting device;
 iv. a first connection port for sending and receiving both power and control communications; and
 v. a second protective housing arranged to protect the first plurality of light emitting diodes; and
b. a second portable lighting device comprising:
 i. a second plurality of light emitting diodes each comprising a third protective housing:
 ii. a second power source coupled to the second plurality of light emitting diodes;
 iii. a second controller coupled to the second plurality of light emitting diodes and to the second power source to control operation of the second portable lighting device, wherein the second controller operates both independently and in response to signals from another portable lighting device;
 iv. a second connection port for sending and receiving both power and control communications; and
 v. a fourth protective housing arranged to protect the second plurality of light emitting diodes; and
c. a connector coupled between the first connection port and the second connection port thereby providing both power and control communications between the first controller of the first portable lighting device and the second controller of the second portable lighting device.

45. The set of portable lighting devices as claimed in claim 44 wherein control communications are able to be initiated by both the first controller and the second controller.

\* \* \* \* \*